United States Patent [19]
Connell

[11] 3,788,707
[45] Jan. 29, 1974

[54] WHEEL TRIM RETENTION

[76] Inventor: James Connell, 5017 Dianna Dr., Bloomfield Hills, Mich. 48013

[22] Filed: Oct. 2, 1972

[21] Appl. No.: 294,375

[52] U.S. Cl. ............................................. 301/37 P
[51] Int. Cl. ............................................. B60b 7/06
[58] Field of Search .......................... 301/37 R, 37 P

[56] References Cited
UNITED STATES PATENTS
2,757,978  8/1956  Lyon ................................. 301/37 R
3,043,632  7/1962  Wagner ............................. 301/37 R FOREIGN PATENTS OR APPLICATIONS
1,209,798  10/1970  Great Britain ..................... 301/37 P

*Primary Examiner*—Richard J. Johnson
*Attorney, Agent, or Firm*—J. King Harness et al.

[57] ABSTRACT

A plurality of axial recesses are provided on and around an axial flange of a wheel trim. A retention clip for retaining the wheel trim on a vehicle wheel is disposed in each recess.

12 Claims, 5 Drawing Figures

WHEEL TRIM RETENTION

BACKGROUND AND SUMMARY OF THE INVENTION

The present invention relates to a retention arrangement for retaining wheel trim on a vehicle wheel.

In prior retention arrangements of the type to which the present invention relates, retaining clips inserted into axial recesses on an axial flange of a wheel trim are used to retain the wheel trim on a vehicle wheel. It is often desirable to manufacture such clips from plastic because of useful and beneficial features and characteristics of plastic; however, in order to develop sufficient retention force for retaining a plastic clip in engagement with the wheel, it has been necessary to utilize a metal spring with the plastic clip.

Among the objects of the present invention are: to improve this type of retention arrangement by eliminating the necessity of having a separate metal spring for developing sufficient retention force; to provide one-piece plastic retention clip which provides suitable retention force without a separate metal spring; and to provide a simpler, yet improved retention clip for retaining wheel trim on a vehicle wheel.

The foregoing objects as well as additional objects, advantages and benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

DESCRIPTION OF THE PREFERRED EMBODIMENT

Figure 1:
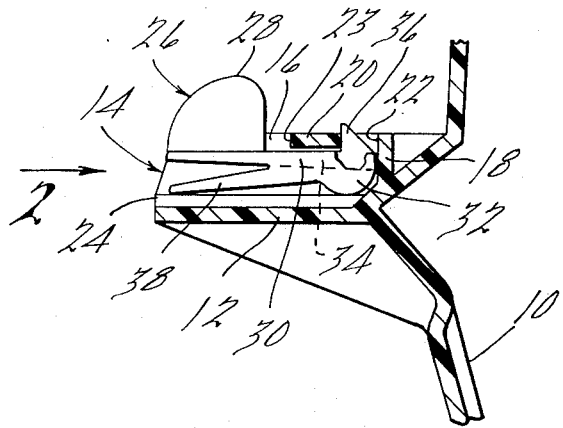
FIG. 1 is a fragmentary sectional view through wheel trim embodying the retention arrangement of the present invention.
Figure 2:
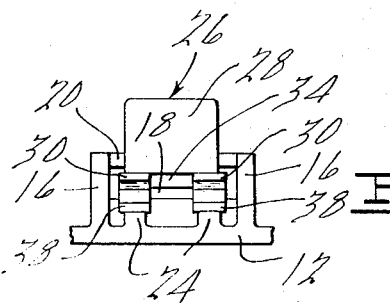
FIG. 2 is an end view taken in the direction of arrow 2 in FIG. 1.

In FIGS. 1 and 2, wheel trim in the form of a plastic decorative cover 10 is provided with an annnular axial flange 12. A plurality of clip-receiving recesses 14 are provided on the radially outer surface of flange 12 at intervals around cover 10. Each recess 14 is defined by a pair of circumferentially spaced side walls 16 which project radially and axially of flange 12. The axially outer end of each recess 14 is defined by an end wall 18 A top wall 20 bridges side walls 16 in axially inwardly spaced relation to end wall 18 and in radially outwardly spaced relation to flange 12 to form an opening 22 between end wall 18 and top wall 20 and an opening 23 axially inwardly of top wall 20. A pair of axial ribs 24 are fashioned on flange 12 within recess 14 and are spaced inwardly of side walls 16.

A one-piece plastic retaining clip 26 is disposed within each recess 14. Clip 26 comprises a wheel flange engaging portion 28 which is adapted to engage an axial flange of the wheel to which cover 10 is applied. Portion 28 protrudes through opening 23 and is supported on the axially inner end portions of a pair of circumereutially spaced axial fingers 30. The axially outer end portions of fingers 30 are radially enlarged by means of radially inwardly projecting curved protuberances 32. The arcuate portions of protuberances 32 rest on ribs 24. A finger 34 extends axially outwardly from portion 28 between fingers 30 and supports a radially outwardly projecting locking tab 36 in cantilever fashion. Clip 26 is positioned in recess 14 by inserting the axially outer end thereof into the open axially inner end of recess 14 then sliding the clip into the recess. During insertion, tab 36 is cammed out of the way by top wall 20 to deflect finger 34 downwardly. When the clip is fully inserted, finger 34 unflexes to lodge tab 36 within opening 22, thereby axially interlocking clip 26 in recess 14.

In accordance with an important aspect of the invention, a pair of circumferentially spaced fingers 38 are fashioned on clip 26 to provide clip 26 with the necessary resiliency for retaining cover 10 on a vehicle wheel. Fingers 38 extend both radially and axially inwardly from the rear portions of fingers 30. The axially inner ends of fingers 38 rest on ribs 24 as shown with the clip in its free state (FIG. 1). Fingers 38 thus intersect fingers 30 at an acute angle with a v-shaped space being formed between each set of circumferentially aligned fingers 30 and 38. Accordingly, with clip 26 in its free state, fingers 38 and protuberances 32 support the axially inner portion of fingers 30 in a substantially axial orientation and in radially outwardly spaced relation to fingers 38.

Figure 3:
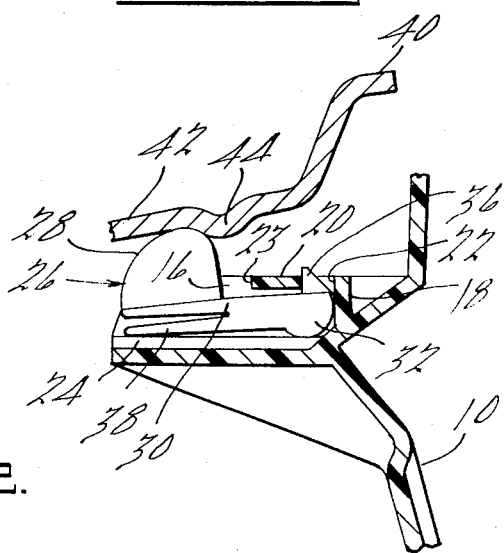
FIg. 3 is a view similar to FIG. 1 showing the wheel trim retained on the wheel of a vehicle.

FIG. 3 shows cover 10 mounted on a vehicle wheel 40. Wheel 40 comprises an axial flange 42 which includes an annular bead 44 protruding radially inwardly. As cover 10 is applied to wheel 40, wheel flange engaging portion 28 of clip 26 initially abuts bead 44. As cover 10 is increasingly moved axially inwardly relative to wheel 40, the interengagement of portion 28 with bead 44 cams portion 28 radially inwardly to pass over bead 44. Clip 26 flexes to accommodate the movement of portion 28. Once portion 28 clears bead 44, clip 26 urges wheel engaging portion 28 radially outwardly to lodge behind bead 44, thereby retaining cover 10 on wheel 40. According to the flexation characteristics of the illustrated preferred embodiment of the invention, fingers 30 flex radially inwardly toward fingers 38, and fingers 38 in turn bear against ribs 24 so that the size of the V-shaped space between each set of fingers is reduced. The rounded periphery of protuberances 32 bearing against ribs 24 facilitates flexing of clip 26. Clip 26, when flexed, exhibits a certain resiliency which urges portion 28 against flange 42, thereby interlocking with bead 44 to maintain cover 10 on wheel 40. FIG. 3 approximately illustrates the shape of clip 26 when flexed. Thus, the invention admirably accomplishes its intended purpose without the use of a separate metal spring. The one-piece plastic clip therefore has the advantages of plastic construction without the complexity of additional separate parts.

Figure 4:
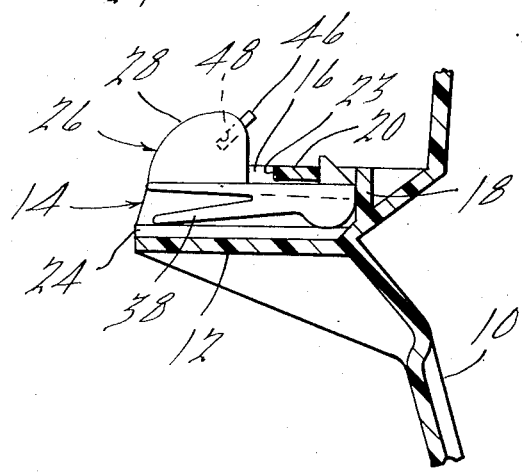
FIG. 4 is a view similar to FIG. 1 illustrating a modified form of the present invention.

The embodiment shown in FIG. 4 is identical to the embodiment of FIGS. 1-3 with one exception. A pair of pins 46 are inserted into bores 48 in wheel engaging portion 28. Pins 46 are positioned to engage bead 44 when cover 10 is mounted on wheel 40.

Figure 5:
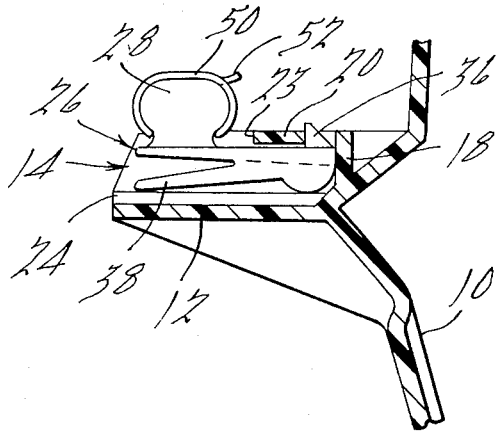
FIG. 5 is a view similar to FIG. 1 illustrating a further modified form of the present invention.

The embodiment shown in FIG. 5 is identical to the embodiment of FIGS. 1-3 with the exception of the shape and construction of wheel engaging portion 28. In FIG. 5, portion 28 is shaped to receive and support a metal cap 50. Cap 50 includes a pair of sharp, pointed barbs 52 which are adapted to embed in bead 44 when cover 10 is mounted on wheel 40. Both embodiments of FIGS. 4 and 5 provide metal-to-metal engagement with wheel 40 which is often desirable in retention arrangements.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. Retention means for retaining wheel trim on the axially outer face of a vehicle wheel having an annular axial wheel flange, said retention means comprising axial flange means extending around said wheel trim adapted to lie radially inwardly of the axial wheel flange when the wheel trim is applied to the wheel, means defining a plurality of clip-receiving recesses on said axial flange means around said wheel trim, and a retention clip disposed in each recess and axially interlocked therewith, each clip comprising finger means extending axially of said recess in radially outwardly spaced relation to said axial flange means, a wheel flange engaging portion supported on the axially inner portion of said finger means, finger support means for supporting the axially outer portion of said finger means on said axial flange means and means for resiliently supporting the axially inner portion of said finger means in spaced relation to said axial flange means comprising additional finger means extending axially inwardly of said finger support means in radially inwardly spaced relation to said first-mentioned finger means and bearing against said axial flange means whereby when said wheel engaging portion interengages the wheel flange upon application of the wheel trim to the wheel, said first-mentioned finger means deflects toward said additional finger means with the wheel flange engaging portion being resiliently urged by the clip against the axial wheel flange to thereby retain the wheel trim on the wheel.

2. Retention means of claim 1 wherein said additional finger means inclines radially and axially inwardly from said finger support means and the axially inner end of said additional finger means bears against said axial flange means.

3. Retention means of claim 1 wherein said additional finger means forms an acute angle with said first-mentioned finger means.

4. Retention means of claim 1 wherein said first-mentioned finger means comprises a pair of circumferentially spaced fingers.

5. Retention means of claim 1 wherein said additional finger means comprises a pair of circumferentialy spaced fingers.

6. Retention means of claim 5 wherein said first-mentioned finger means comprises a pair of circumferentially spaced fingers.

7. Retention means of claim 6 wherein the fingers of said additional finger means are circumferentially aligned with the fingers of said first-mentioned finger means.

8. Retention means of claim 7 wherein the fingers of said additional finger means form an acute angle with the fingers of said first-mentioned finger means.

9. Retention means of claim 8 where said finger support means comprises a protuberance at the axially outer end of each finger of said first-mentioned finger means, each protuberance comprising a curved surface bearing against said axial flange means.

10. Retention means of claim 1 wherein said wheel flange engaging portion comprises an outwardly extending protuberance and metal retention means thereon for providing metal-to-metal contact with the axial wheel flange.

11. Retention means of claim 10 wherein said metal retention means comprises at least one pin embedded in a said protuberance, said at least one pin being adapted to bite into the axial wheel flange.

12. Retention means of claim 10 wherein said metal retention means comprises a metal element on said protuberance, said element comprising at least one sharp barb adapted to bite into the axial wheel flange.

* * * * *